W. C. STEVENS.
MACHINE FOR INSERTING CROSS WIRES IN SOLID TIRES.
APPLICATION FILED JUNE 18, 1915.

1,274,465.

Patented Aug. 6, 1918.
5 SHEETS—SHEET 1.

Witness:
John W. Kittredge
Lewis T. Heist

Inventor
William C. Stevens.
By
Attorney

W. C. STEVENS.
MACHINE FOR INSERTING CROSS WIRES IN SOLID TIRES.
APPLICATION FILED JUNE 18, 1915.

1,274,465.

Patented Aug. 6, 1918.
5 SHEETS—SHEET 4.

Witness:
John W. Kittredge

Inventor
William C. Stevens.

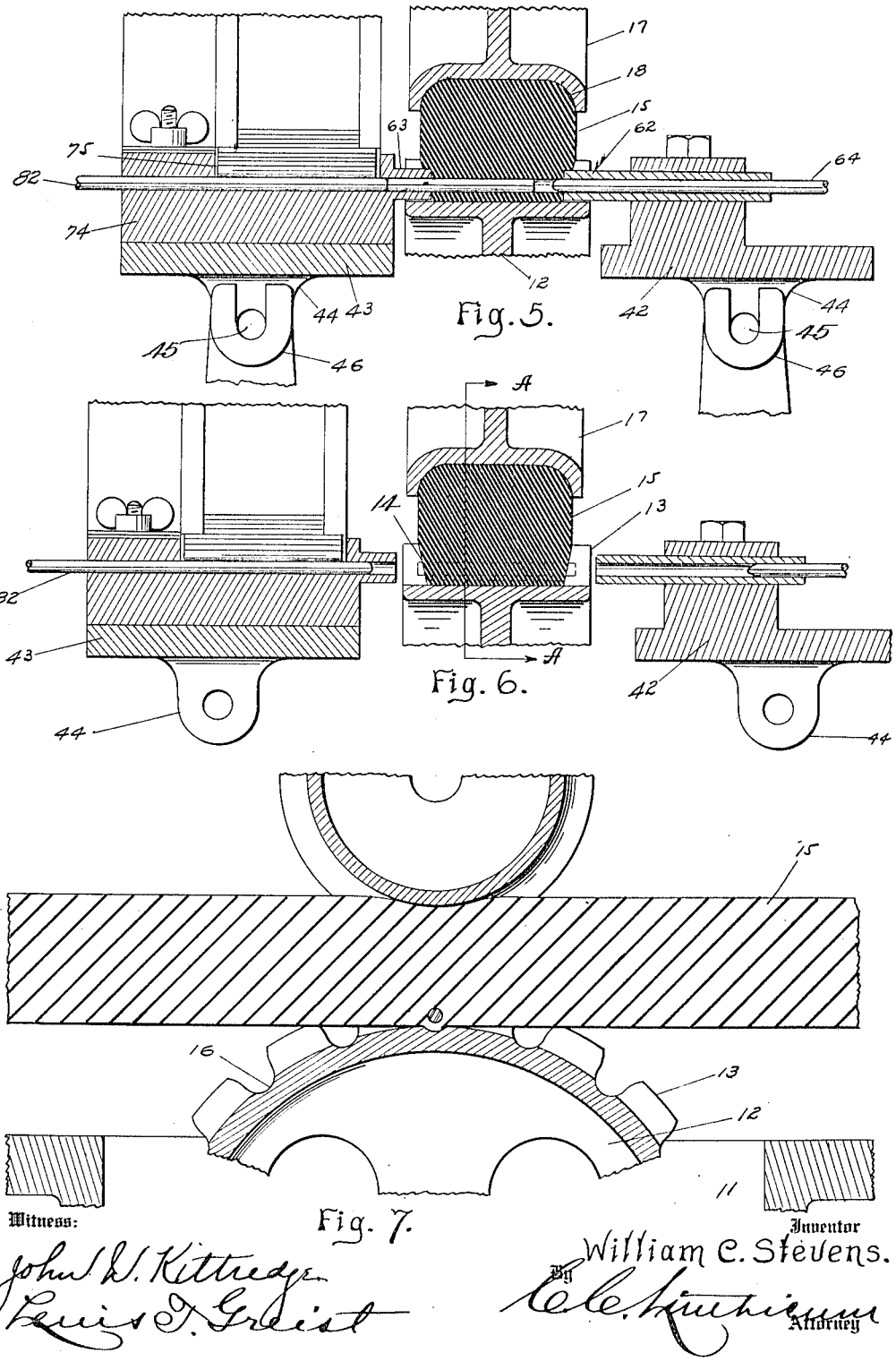

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

MACHINE FOR INSERTING CROSS-WIRES IN SOLID TIRES.

1,274,465.

Specification of Letters Patent.

Patented Aug. 6, 1918.

Application filed June 18, 1915. Serial No. 34,801.

*To all whom it may concern:*

Be it known that I, WILLIAM C. STEVENS, a citizen of the United States, residing at Akron, in the county of Summit and State of Ohio, have invented certain new and useful Improvements in Machines for Inserting Cross-Wires in Solid Tires, of which the following is a specification.

In a certain class of solid tires, short wires are placed in the base of the tire, and project a short distance beyond each lateral face. About the projecting ends of the wires are placed two circumferential side wires, which hold the tire to the rim of the wheel. Practical machines have been devised heretofore for inserting wires of small cross section in the bases of tires, the wire being fed as a continuous strand, and being cut off by the machine after insertion in the tire. For wires of large diameter, which it was impossible to cut in a machine of this character, the custom has been to drill holes in the base of the tire, and then insert the wires by hand.

The machine forming the subject matter of the present application, is devised to drill holes in the base of cushion tires, and insert therein cross wires, which have been previously cut to the proper size. In order to insert the cross wires of large diameter, which it is the purpose of this machine to handle, it has been found necessary to furnish a vent into which the rubber may "flow" during the insertion of the needle and the placing of the cross wires. It is one of the objects of this invention to construct a machine in which this operation may be performed.

This and other objects will be apparent, upon consideration of the specification and drawing, in which like reference numerals refer to like parts, and in which—

Fig. 5 is an enlarged longitudinal section through the tire and needle and cross wire channels, showing the cross wire inserting plunger and needle just before the end of one complete stroke;

Fig. 6 is a cross section showing the needle about to commence a new stroke with the reciprocating slides retracted;

Fig. 7 is a longitudinal section on the line A—A of Fig. 6, showing particularly, the manner in which the construction of the feed drum enables the rubber to "flow" upon the insertion of the needle in the cross wire;

Fig. 8 is a cross section through the end of the cross-wire delivery chute showing a stop in position to prevent movement of the wires in the chute.

Figure 1:
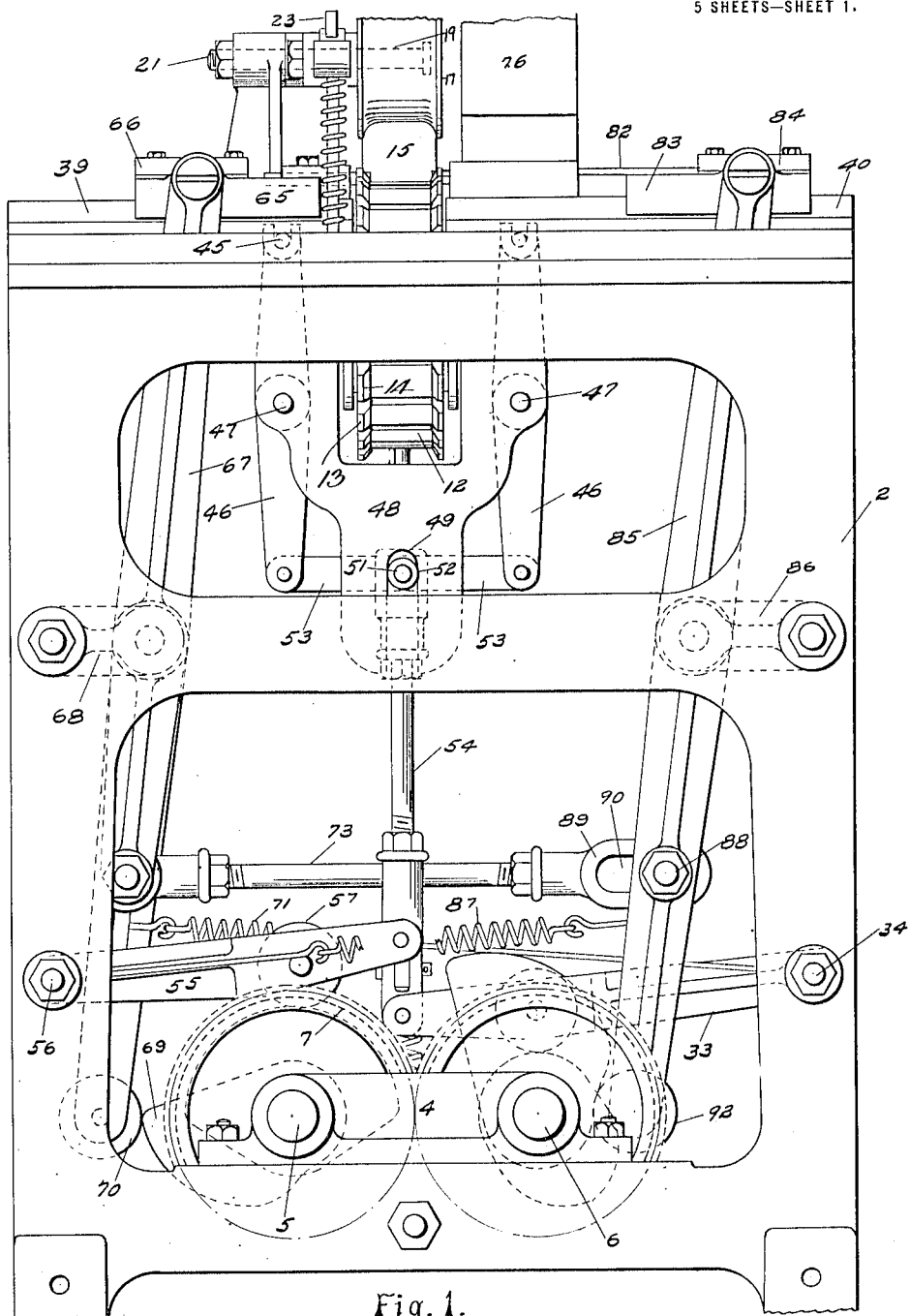
Figure 1 is an elevation of the machine.

In the drawings 1 and 2 represent standards, which together with a top plate 3, form the frame-work of the machine. In the lower part of the standards in any suitable bearing, such as 4, are mounted two longitudinal shafts 5 and 6, either one of which may be driven from any source of power. The two shafts are connected for concerted movement by intermeshing gear wheels 7 at the rear of the machine. In the drawing, the shaft 6 is shown carrying a gear wheel 8, which meshes with, and is driven by pinion 9 on a power shaft 10.

Figure 2:
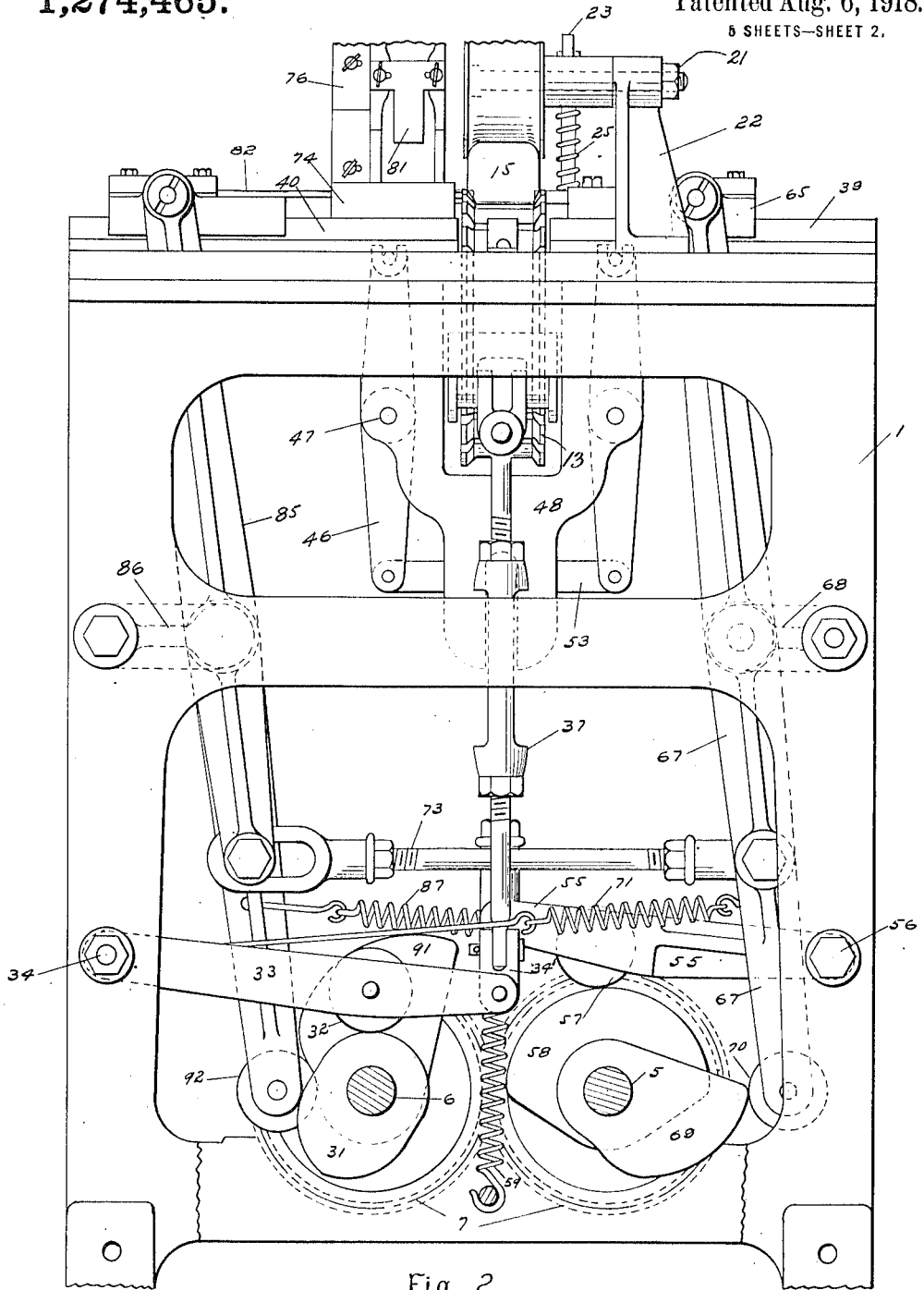
Fig. 2 is a front elevation with the lower framework broken away to show the cam mechanism for operating the moving parts of the machine.
Figure 3:
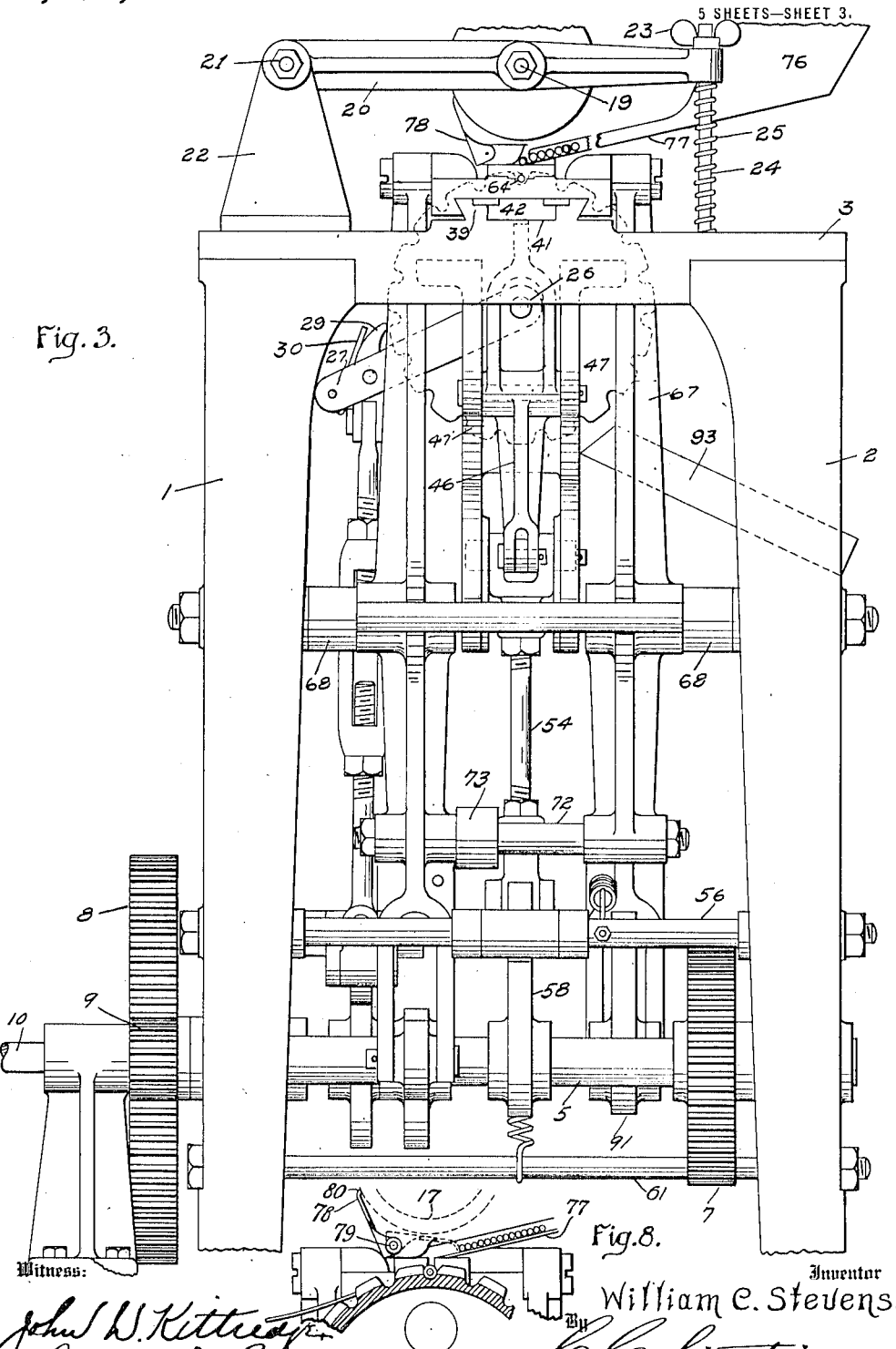
Fig. 3 is an elevation on the right-hand side of the machine, as shown in Fig. 2, which will be called hereafter the needle, or drilling side.

Before entering into a further description of this machine, it should be explained that in order to insert cross wires in green rubber tires, it is necessary upon piercing the holes, to insert the cross wires immediately thereafter, or upon withdrawal of the needle. For this purpose, the machine is constructed with means to support and advance the green tire step by step, a piercing or drilling element located at one side of the path of the tire, and a cross wire inserting or driving mechanism at the other side, the operation of the piercing and inserting mechanisms, being so timed, that the cross wire will be inserted in the hole in the base of the tire, as the needle is withdrawing therefrom. The two sides of the machine may conveniently be called the drilling or piercing side, which is the right-hand side of Fig. 2, and the inserting side, which is the left-hand side of the same figure.

The top plate 3 is cut away as at 11, and in this aperture is rotatably mounted a feeding and tire supporting drum 12, which is annular in form, and supported by a shaft 26. About the edges of the drum are formed two circumferential flanges 13, having inwardly inclined faces 14, between which the base of the tire 15 is adapted to seat and by which lateral shifting thereof is prevented. The surface of the drum is provided with evenly spaced transverse breaks, the purpose of which will later appear, shown in the drawings as grooves or depressions 16, which extend entirely across the face of the drum, and through the flanges.

Mounted directly above the drum is a pressure and guiding roller 17, the surface of which is flanged as at 18, to receive the upper or tread portion of the tire. Guiding or pressure roller 17 is mounted for rotary movement on a shaft 19 secured midway on a rocking arm 20, pivoted at 21 in a standard 22, rising from the bed plate of the machine. Pressure is applied to the rocking arm, and through it to the tire by a wing nut 23, screwed on the upper end of a pin 24, rising from the bed plate of the machine, and passing through a slot or eye in the end of the arm 20. Coiled spring 25 surrounds the pin 24 between the end of the rocking arm and the bed plate, and cushions the pressure roller.

Intermittent rotary movement is imparted to the drum 12 by the following mechanism:

Rockingly mounted on a shaft 26 on either side of the drum, are two levers 27, connected by transverse rod 28, on which is loosely mounted a pawl 29, the pointed end of which is adapted to take in the transverse groove 16 in the feed drum. The pawl is urged toward the feed drum by the end of a spring 30, which is coiled on the rod 30', connecting the ends of the rocking arms. Rocking movement sufficient to advance the feed drum the distance between the grooves, is imparted to the levers 27 by a cam 31, rigidly secured to the shaft 6, acting through the roller 32 mounted in the rocking lever 33, pivoted on a transverse rod 34 in the frame-work. At the end of this rocking lever is pivotally mounted a short bifurcated member 34', in the end of which is pivotally held one end of an adjustable link, the other end of which is pivotally connected to a second bifurcated member 35, loosely suspended on the cross rod 28. The adjustable link is composed of two short screw threaded rods 36, and an intermediate turn-buckle 37. The purpose of making the connecting link adjustable, is to permit the mounting of drums of different sizes, and differently spaced grooves in the machine. In order to prevent any backward movement of the drum, there is secured to the upper side of the plate 3, a spring pawl 38, which takes in the groove 16. On the upper side of the bed plate are formed two alined dove-tailed guides 39 and 40, the former on the piercing side, and the latter on the inserting side of the machine, and in the upper surface of these guides are formed alined guideways 41, in which are mounted slides 42 and 43 respectively.

On their under sides, the slides 42 and 43 carry pairs of alined ears 44, in each of which pair a pin 45 is secured. Bifurcated ends of levers 46 are received over pins 45, these levers being pivotally mounted on pins 47, bridging flanges 47' on a Y-shaped hanger 48, depending from the under side of the bed plate. The upper arms of the hanger 48 pass on either side of the feed drum. The lower arm of the hanger is formed in two forks which are cut out to form guide-ways 49, and in these guide-ways is reciprocated a pin 51, on the ends of which are mounted rollers 52, which run in on the guide-ways. The pin 51 forms the knee of a toggle lever 53, the extremities of which are pivoted to the lower ends of the levers 46. Vertically movable longitudinally adjustable link 54 is connected at one end to the pin 51, and at the other end to a rocking lever 55, mounted on a cross rod 56. At an intermediate point in the lever 55, is a roller 57, which bears on the periphery of a cam 58, rigidly secured on the shaft 5. Responsiveness to the cam 58 is secured by a spring 59 fastened at its upper end to a clevis 60 on the free end of the lever 55, and at its other end to a transverse rod 61, in the frame-work.

The operation of the parts just described is as follows:

Cam 58 is so shaped that during half of its revolution, the lever 55 is elevated, and during the other half, it is lowered. When the roller 57 is on the high part of the cam, the toggle links 53 will be straightened, and the upper ends of the levers 46 drawn toward each other. This will cause the slides 42 and 43 to move toward their inward limit as shown in Fig. 5, and while the lower part of the cam is presented to the roller 57, the slides will be in their outward limit, as shown in Fig. 6. Slides 42 and 43 carry tubular guides 62 and 63, which serve several purposes. Upon the inward movement of slides 42, which takes place after the termination of the feeding movement of the drum, the projecting ends of tubes enter the ends of the grooves, and serve to further lock the drum. The tubes also press into the sides of the tire, and firmly hold it in position to have the piercing and inserting operations take place. The tube 62 further serves as a guide for the piercing or drilling needle, which is designated as 64.

The needle 64 is clamped by a plate 66 to a plate 65, slidably mounted on the rib 39. Reciprocating movement on the rib is imparted to the plate or slide, by a pair of vertically disposed rocking levers 67, pivotally carried on the frame-work by swinging links 68. A cam 69 secured to the shaft 5, contacts a roller 70 in the lower end of one of the levers 67, the two being held in engagement by a spring 71. The contour of the cams 58 and 69, and the location of their rollers 57 and 70, is such that inward and outward movement of the needle carrying slide takes place while the slide 42 is in its inward position.

The two levers 67 are connected by a rod 72, which carries one end of a plunger actuating link 73, the operation of which will presently appear.

The operation of the parts of the machine on the needle or drilling side having been described, the parts of the machine on the cross wire carrying and inserting side, will now be described.

Figure 4:
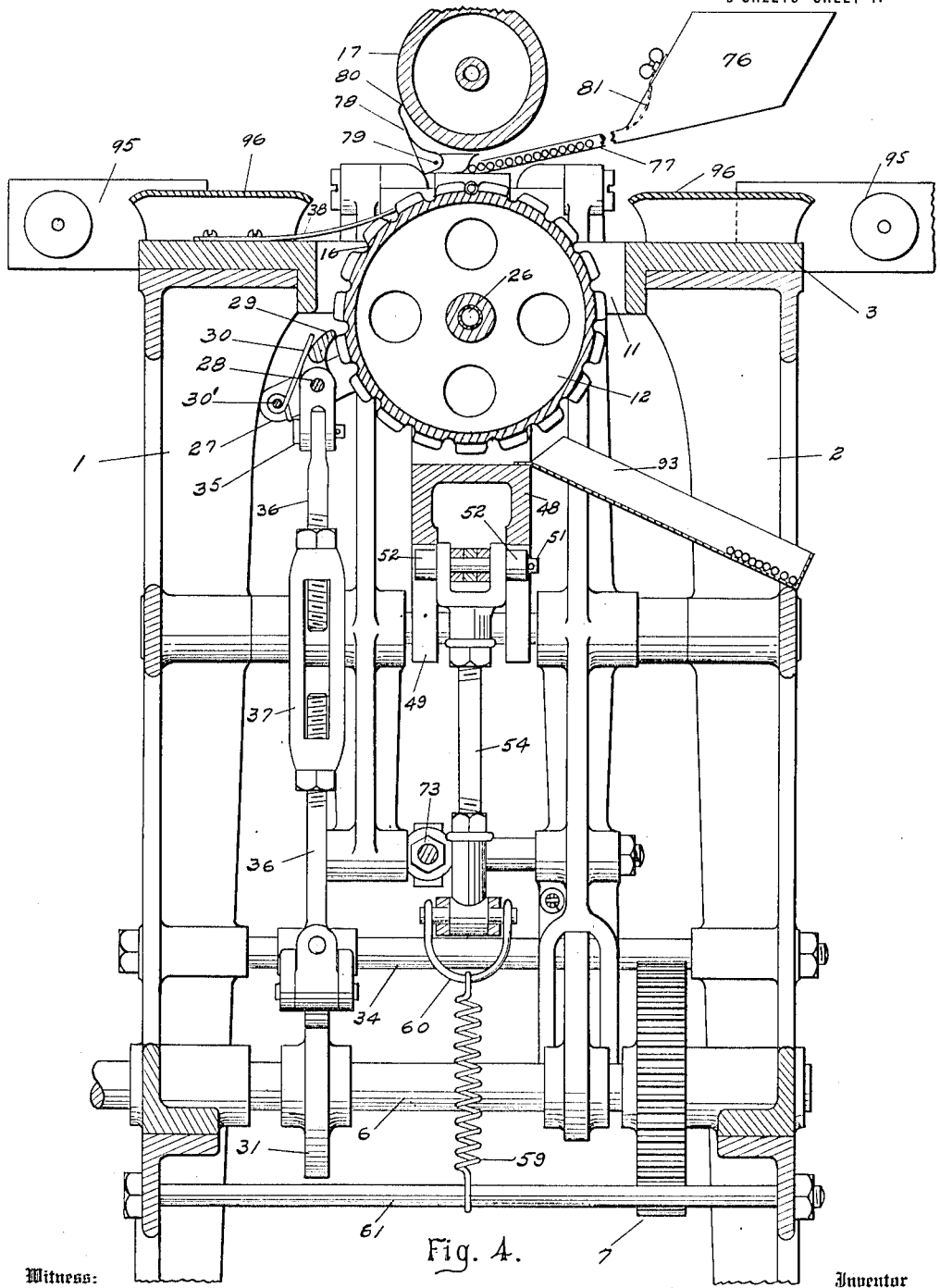
Fig. 4 is a cross section through the center of the supporting and feeding drum.

A block 74 is secured to the upper face of the slide 43, and carries on its inner face the tubular projection 63, previously described. The guide-way or bore of the projection is continued through the block in line with the needle, and is of the same, or approximately the same diameter, as the cross wire. The upper surface of the block is cut away at 75 to meet the bore, a distance long enough to receive the longest cross wires which the machine is adapted to handle, and thereon is mounted a cross wire hopper 76. The hopper 76 is supported by the block, and consists of a large reservoir which terminates in an elongated passage-way or spout 77, of a depth sufficient to let down a stream of cross wires one at a time, the spout debouching into the bore through the opening 75. The hopper and spout are laterally adjustable to properly handle cross wires of different length. A swinging gate 78 is pivoted on the block 74 at 79 and is provided with the curved end 80, the construction being such that when the gate is rocked to the right as shown in Fig. 4, the end thereof enters the passage-way 77 and blocks the pins therein. A light strip of curved spring metal 81 is fastened to the front of the hopper 76, and extending to the upper end of the spout, tends to make the cross wires pass out of the hopper in an even single row.

For the purpose of locating the cross wires in the base of the tire, there is provided a plunger or hammer 82, the forward end of which is received in the transverse bore of the plate 74. The rear end of the plunger is firmly held by a clamp plate 84 on a slide 83, mounted on the guide 40. Levers 85 pivoted to swinging links 86, from the frame serve to actuate the slide 83. In the normal position of the slide 83, the levers 85 hang in approximately vertical position, such position being brought about by the weight of the levers, aided by the spring 87. In this position, the wire inserting plunger or hammer is as shown in Fig. 6, extending entirely under the discharging point of the hopper, prevents the next cross wire from dropping into the bore. Connecting the levers 85 at a point below the swinging links 86, is a cross rod 88, on which is mounted a member 89, adjustably secured to the link 73. The member 89 is provided with an elongated eye 90.

The purpose of this construction is briefly, as follows:

During the major portion of the movement of the needle, and by reason of the elongated eye previously referred to, the connecting link 73 does not affect the levers 85. On reaching the inward end of the movement of the needle, the levers 67 by means of the link 73, give the lower end of the levers 85 a quick inward movement, which in turn, gives the cross wire inserting plunger a quick outward movement. By this means, the lower end of the chute 75 is uncovered, and a new cross wire drops down into the bore in front of the plunger. Immediately after the dropping of the cross wire, the roller 70 passes over the high part of the cam 69, and the needle is drawn back by the spring 71. A cam 91 on the shaft 6, now forces the roller 92 on the lower end of one of the levers 85 outwardly, and drives the hammer or plunger 82 inwardly, as shown in Fig. 5, the cross wire entering the hole in the bottom of the tire directly behind the retreating needle. The inward movement of the plunger continues until the cross wire is placed in the proper position in the tire, as shown in dotted line in Fig. 6, at the end of which movement, it resumes a position under the spout of the hopper, by means of the levers 85, aided by the spring.

If at any time there should be no tire present in the machine during the working, the cross wires will fall into the groove in the feed wheel, and upon turning, will be delivered into a catch box 93, secured to the hanger, and the frame of the machine as shown in Fig. 4. Runways 95, and plates 96 serve to support the tire on both sides of the feed drum.

The operation of the machine is briefly, as follows:

The parts being in position shown in Fig. 6, and the hopper filled with cross wires, the forward one of which passes into the opening 75, a tire is placed by hand on the feed drum under the pressure roller, and the proper pressure applied by the wing nut. The machine is now started, and the tire advanced step by step by the feed drum, moved by the pawl and its actuating parts. Upon termination of each feeding movement, the slides 42 and 43 are moved inward by actuation of the toggle lever, and the forward ends of the tubes 62 and 63 enter the grooves in the feed wheel, and press firmly against the side of the tire, as shown in Fig. 5. While the tire is thus firmly held in position, the needle is advanced through the tube 62 into the tire, and a short way into the tube 63. Toward the inner limit of its movement, the needle actuating levers 67 by the connecting link 73, pull over the levers 85, withdrawing the plunger from the lower end of the wire delivery chute, and a wire drops down in the bore. The roller 70 now passes over the high part of the cam 69, and the needle is drawn out of the tire by the spring 71. At this point the cam 91 forces the plunger inwardly, driving the cross wire into the hole in the tire, as the needle retreats. The grooves in the feed drum allow the rubber to be displaced, or "flow," as the piercing and inserting operations are taking place. When the cam 91 has passed from under roller, the plunging actuating levers resume their vertical position as before. The slides 43 are now withdrawn upon further rotation of the cam 58, and the feed drum is ready for its next advance.

It is obvious that various changes and modifications might be made in the machine as shown and described, without changing the scope of the invention, or losing any of the benefits thereof, as set forth in the appended claims.

What I claim is:

1. A machine of the character described, comprising means for advancing a tire through the machine, guides at either side of the tire, means for moving said guides against the tire, and a piercing element and a wire inserting element operable through said guides.

2. A machine of the character described, comprising means for advancing a tire through the machine, guides at either side of the tire, means for simultaneously moving said guides toward and away from the tire, and a piercing element and a wire inserting element operable through said guides.

3. A machine of the character described, comprising means for advancing a tire through the machine, guides at either side of the tire, means for moving said guides against the tire at intervals, means for piercing said tire, and means for inserting wires in said tire, operable through said guides while they are against the tire.

4. A machine of the character described, comprising two members adapted to hold a rubber tire, and piercing and wire inserting means adapted to act on said tire, the holding means being recessed to accommodate the rubber of the tire displaced upon the actuation of the piercing and wire inserting means.

5. A machine of the character described, comprising a supporting drum for a tire, a pressure roller to hold said tire on the supporting drum, piercing and wire inserting means adapted to act on said tire, the drum being provided with spaces into which the rubber of the tire may be displaced upon actuation of the piercing and wire inserting means.

6. A machine of the character described, comprising a supporting drum for the tire, a pressure roller to hold said tire on the supporting drum, piercing and wire inserting means adapted to act on the tire, the drum being provided with grooves into which the rubber of the tire may be displaced upon the actuation of the piercing and wire inserting means, and means for advancing the tire through the machine.

7. A machine of the character described, comprising a supporting drum for the tire, a pressure roller to hold said tire on the supporting drum, piercing and wire inserting means adapted to act on the tire, the drum being provided with grooves into which the rubber of the tire may be displaced upon the actuation of the piercing and wire inserting means, and means for intermittently rotating the supporting drum to advance the tire through the machine.

8. A machine of the character described, comprising a supporting drum for the tire, a pressure roller to hold said tire to the supporting drum, piercing and wire inserting means adapted to act on the tire, the drum being provided with grooves into which the rubber of the tire may be displaced upon the actuation of the piercing and wire inserting means, guides for the piercing and wire inserting means, and means for simultaneously moving said guides toward and away from said tire.

9. A machine of the character described, comprising a supporting drum for the tire, a pressure roller to hold said tire to the supporting drum, piercing and wire inserting means adapted to act on the tire, the drum being provided with grooves into which the rubber of the tire may be displaced upon the actuation of the piercing and wire inserting means, guides for the piercing and wire inserting means, and means for simultaneously moving said guides toward and away from said tire, said guides being adapted to press against the tire upon the completion of their inward movement.

10. A machine of the character described, comprising a supporting drum for the tire, a pressure roller to hold said tire to the supporting drum, piercing and wire inserting means adapted to act on the tire, the drum being provided with grooves into which the rubber of the tire may be displaced upon the actuation of the piercing and wire inserting means, guides for the piercing and wire inserting means, and means for simultaneously moving said guides toward and away from said tire, said guides being arranged to enter said grooves and, upon the completion of their inward movement, to press against the tire.

11. A machine for inserting previously cut wires in rubber tires, comprising means for supporting and advancing said tire through the machine, a piercing element on one side of the tire, a plunger on the other side of the tire in alinement with said piercing element, means for feeding cross wires in front of said plunger, means for reciprocating said piercing element into and out of said tire and means for forcing said plunger toward the tire upon backward movement of said piercing element.

12. A machine for inserting cross wires in cushion tires, comprising means for supporting and advancing said tire, a piercing element, and a wire inserting plunger, a chute for feeding cross wires in the path of said plunger, means for normally holding said plunger under the delivery end of said chute, means for forcing said piercing element into said tire and means operative upon termination of the inward movement of said piercing element for withdrawing the plunger from under the delivery end of the chute.

13. A machine for inserting cross wires in cushion tires, comprising means for supporting and advancing said tire, a piercing element and a wire inserting plunger, a chute for feeding cross wires in the path of said plunger, means for normally holding said plunger under the delivery end of said chute, means for forcing said piercing element into said tire, means operative upon termination of the inward movement of said piercing element for withdrawing the plunger from under the delivery end of the chute and means for moving said plunger toward the tire upon the retraction of said piercing element.

14. A machine for inserting cross wires in cushion tires, comprising means for supporting the tire, means for piercing and inserting cross wires in the tire, and means for subjecting the portion of the tire in which the piercing and inserting operations take place to lateral pressure during the said operations.

15. A machine for inserting cross wires in cushion tires, comprising means for supporting the tire, means for piercing and inserting cross wires in the tire, guides for said piercing and cross wire inserting means, and means to force the guides against the base of the tire during the piercing and inserting operations, whereby the tire is put under lateral pressure.

16. In a machine for inserting cross wires is solid tires, the combination of a tire supporting and advancing means, a tire piercing and wire driving means, guides on opposite sides of the tire, and means for holding the guides against the tire during the operation of the piercing and wire driving mechanism and withdrawing them after the termination of the piercing and driving movements.

17. In a machine for inserting cross wires in solid tires, the combination of a rotary supporting and feeding drum, a roller adjacent the drum arranged to contact the side of the tire opposite to said drum, guides arranged laterally of the drum and movable to be pressed into engagement with the sides of the tire, means for actuating said guides, and a perforating needle and wire driving device on opposite sides of the drum.

18. In a machine for inserting cross wires in solid tires, the combination of a rotary supporting and feeding drum, a roller adjacent the drum and arranged to contact the side of the tire opposite to said drum, guides arranged laterally of the drum and movable to be brought into and out of engagement with the sides of the tire, means for actuating said guides, the guides being provided with openings, and a perforating needle and a wire driving device on opposite sides of the drum adapted to pass through said openings.

19. In a machine for inserting cross wires in solid tires, the combination of a rotary supporting and feeding drum, a tire perforating needle and a wire driving device, and apertured guides arranged to be held in engagement with the sides of the tire during operation of the perforating and driving devices.

20. In a machine for inserting cross wires in solid tires, the combination of a rotary tire supporting drum provided with a series of recesses, a reciprocatory guide on one side of the tire in line with the recesses, a perforating needle and a wire driving device on opposite sides of said drum, the guide being apertured for the passage of the needle, and means for operating the needle, the guide, and the driving device.

21. In a machine for inserting cross wires in solid tires, the combination of a rotary annular tire supporting drum provided with a series of recesses, tire directing means on said drum at the sides thereof for holding it from lateral displacement in its movement through the machine, and a tire perforating, and a wire driving device on opposite sides of said drum, the directing means being apertured for the passage of the tire perforating means, and means arranged to enter the recesses in succession to lock the drum in position step by step.

22. In a machine for inserting cross wires in solid tires, the combination of a rotary annular tire supporting drum having a peripherally arranged series of recesses to accommodate the rubber displaced by the inserted wires, tire directing means on said drum at the sides thereof for preventing lateral displacement of the tire during its movement through the machine, a tire perforating and a wire driving device on opposite sides of the drum, the said directing means being apertured for the passage of the tire perforating device and the wire, means arranged to enter the recesses of the drum to lock the same in position step by step and a pressure roller above said drum.

23. A machine for embedding cross wires in the rim-engaging portions of a tire comprising an annularly-shaped drum constituting a supporting means for a tire and provided with peripheral transverse grooves, a guide provided with an opening and arranged to be brought into and out of position to engage the lateral face of the tire while on said drum and to interlock with one of the peripheral grooves of the drum, a roller engaging the tread portion of the tire while mounted on said drum, a piercing element adapted to pass through said opening in said guide and to form openings transversely in the supported tire, and means for inserting a fastener in said opening after the withdrawal of said piercing element.

WILLIAM C. STEVENS.

Witness:
J. J. SHEA.